(12) United States Patent
Brady et al.

(10) Patent No.: US 7,561,274 B2
(45) Date of Patent: Jul. 14, 2009

(54) OPTICAL SPECTROSCOPY UTILIZING PLANAR SPECTRAL FILTERS

(75) Inventors: David J Brady, Durham, NC (US); Bob D Guenther, Cary, NC (US); Michael E Gehm, Durham, NC (US); Scott T McCain, Durham, NC (US)

(73) Assignee: Duke University, Durham, NC (US)

( * ) Notice: Subject to any disclaimer, the term of this patent is extended or adjusted under 35 U.S.C. 154(b) by 450 days.

(21) Appl. No.: 11/532,554

(22) Filed: Sep. 18, 2006

(65) Prior Publication Data

US 2007/0091315 A1    Apr. 26, 2007

Related U.S. Application Data

(60) Provisional application No. 60/728,312, filed on Oct. 20, 2005.

(51) Int. Cl.
*G01B 9/02* (2006.01)
*G01J 3/45* (2006.01)

(52) U.S. Cl. ..................................... 356/454
(58) Field of Classification Search .............. 356/451, 356/454, 456
See application file for complete search history.

(56) References Cited

U.S. PATENT DOCUMENTS

| | | | | |
|---|---|---|---|---|
| 4,998,017 A | * | 3/1991 | Ryan et al. ................. | 250/343 |
| 5,218,422 A | * | 6/1993 | Zoechbauer ................ | 356/454 |
| 5,461,477 A | * | 10/1995 | Marinelli et al. ............ | 356/454 |
| 5,600,432 A | | 2/1997 | Lengyel et al. | |
| 5,973,838 A | * | 10/1999 | Shirasaki ................... | 359/577 |
| 6,118,530 A | | 9/2000 | Bouevitch et al. | |
| 6,985,233 B2 | * | 1/2006 | Tuschel et al. .............. | 356/454 |
| 6,995,840 B2 | | 2/2006 | Hagler | |
| 7,027,198 B2 | * | 4/2006 | Yao ........................... | 359/259 |
| 7,030,991 B1 | * | 4/2006 | Kampe et al. ............... | 356/454 |
| 7,061,606 B2 | | 6/2006 | Treado et al. | |
| 7,092,101 B2 | | 8/2006 | Brady et al. | |
| 7,218,436 B2 | * | 5/2007 | Yao ........................... | 359/259 |
| 7,253,897 B2 | | 8/2007 | Moon et al. | |
| 7,304,798 B2 | * | 12/2007 | Izumi et al. ................. | 359/577 |
| 7,342,658 B2 | * | 3/2008 | Kowarz et al. .............. | 356/328 |
| 2002/0044280 A1 | * | 4/2002 | Weigold et al. ............. | 356/326 |

(Continued)

OTHER PUBLICATIONS

Conde, M. "Deriving Wavelength Spectra from Fringe Images from a Fixed-Gap Single-Etalon Fabry-Perot Spectrometer." Applied Optics 41(14): 2672-2678, May 10, 2002.

(Continued)

*Primary Examiner*—Patrick J Connolly
(74) *Attorney, Agent, or Firm*—Coats & Bennett, P.L.L.C.

(57) ABSTRACT

An optical spectrometer and/or a method of optical spectroscopy is described herein. One exemplary spectrometer includes a planar spectral filter, a dispersion system, and a detector array having at least two dimensions. The planar spectral filter filters incident light to generate a plurality of wavelength dependent spatial patterns. The dispersion system disperses the spatial patterns along at least one dimension in a wavelength dependent fashion onto the detector array. As a result, spatial patterns corresponding to different wavelengths are centered at different locations on the detector array. The dispersed spatial patterns superimpose at the detector array in an offset but overlapping relationship, creating an asymmetric image that facilitates the spectral analysis of a wide range of light sources, including diffuse or spectrally complex light sources.

21 Claims, 6 Drawing Sheets

U.S. PATENT DOCUMENTS

| | | | |
|---|---|---|---|
| 2002/0044282 A1* | 4/2002 | Moeller et al. | 356/369 |
| 2002/0105653 A1* | 8/2002 | Pezeshki | 356/519 |
| 2003/0142318 A1* | 7/2003 | Kuiseko | 356/456 |
| 2004/0032585 A1 | 2/2004 | Johansen et al. | |
| 2004/0207855 A1 | 10/2004 | Brady et al. | |
| 2004/0218172 A1 | 11/2004 | DeVerse et al. | |
| 2005/0046837 A1* | 3/2005 | Izumi et al. | 356/326 |
| 2005/0047786 A1* | 3/2005 | Kawahata | 398/81 |
| 2007/0091315 A1* | 4/2007 | Brady et al. | 356/451 |

OTHER PUBLICATIONS

Shepherd, G. et al. "A Spatial Spectral Scanning Technique for Fabry-Perot Spectrometer." Applied Optics 4(3): 267-272, Mar. 1965.

Xu, Z. et al. "Multimodal Multiplex Spectroscopy Using Photonic Crystals." Optics Express 11(18): 2126-2133, Sep. 8, 2003.

* cited by examiner

US 7,561,274 B2

OPTICAL SPECTROSCOPY UTILIZING PLANAR SPECTRAL FILTERS

This patent claims priority from U.S. Provisional Application No. 60/728,312, filed 20 Oct. 2005, which is incorporated herein by reference in its entirety.

BACKGROUND

The present invention relates generally to optical spectrometers, and more particularly to planar spectral filter optical spectrometers.

Optical spectrometers isolate individual wavelength components of light radiated from a source to measure wavelength-specific properties of the source. Scientists use optical spectrometers to analyze characteristics of various specimens, such as geological samples, biomedical samples, etc. Some optical spectrometers include a Fabry-Perot filter, a lens, and a detector array. The filter generates a spatial interference pattern based on the incident light from the source, while the lens images the spatial pattern onto the detector array. Detector elements in the detector array convert sensed light to an electrical output signal.

Fabry-Perot spectrometers are particularly useful for astronomical light sources and other light sources having modest modal and spectral complexity. However, the radially symmetric spatial patterns generated by the Fabry-Perot filter and the free spectral range of the Fabry-Perot filter create degenerate spatial patterns. This severely limits the spectrometer's ability to analyze light from a spectrally complex source. As a result, conventional Fabry-Perot spectrometers generally cannot be used to analyze diffuse or spectrally complex light sources. In view of this, and in view of the limitations of other known spectrometers, there remains a need for alternative spectrometer designs.

SUMMARY

The present invention provides an optical spectrometer and/or a method of optical spectroscopy that overcomes the degeneracy problems associated with conventional Fabry-Perot spectrometers. One spectrometer according to the present invention includes a planar spectral filter, a dispersion system, and a detector array having at least two dimensions. The planar spectral filter filters incident light to generate a plurality of wavelength dependent spatial patterns. The dispersion system disperses the spatial patterns along at least one dimension in a wavelength dependent fashion onto the detector array. As a result, spatial patterns corresponding to different wavelengths are centered at different locations on the detector array. The offset spatial patterns overcome the free spectral range limitation by preventing the spatial patterns corresponding to integer multiples of the free spectral range from fully overlapping at the detector array. Further, the dispersed spatial patterns superimpose at the detector array in an offset relationship, creating an asymmetric image that facilitates multi-dimensional sampling. Related light processing methods are also described.

DETAILED DESCRIPTION

Figure 1:
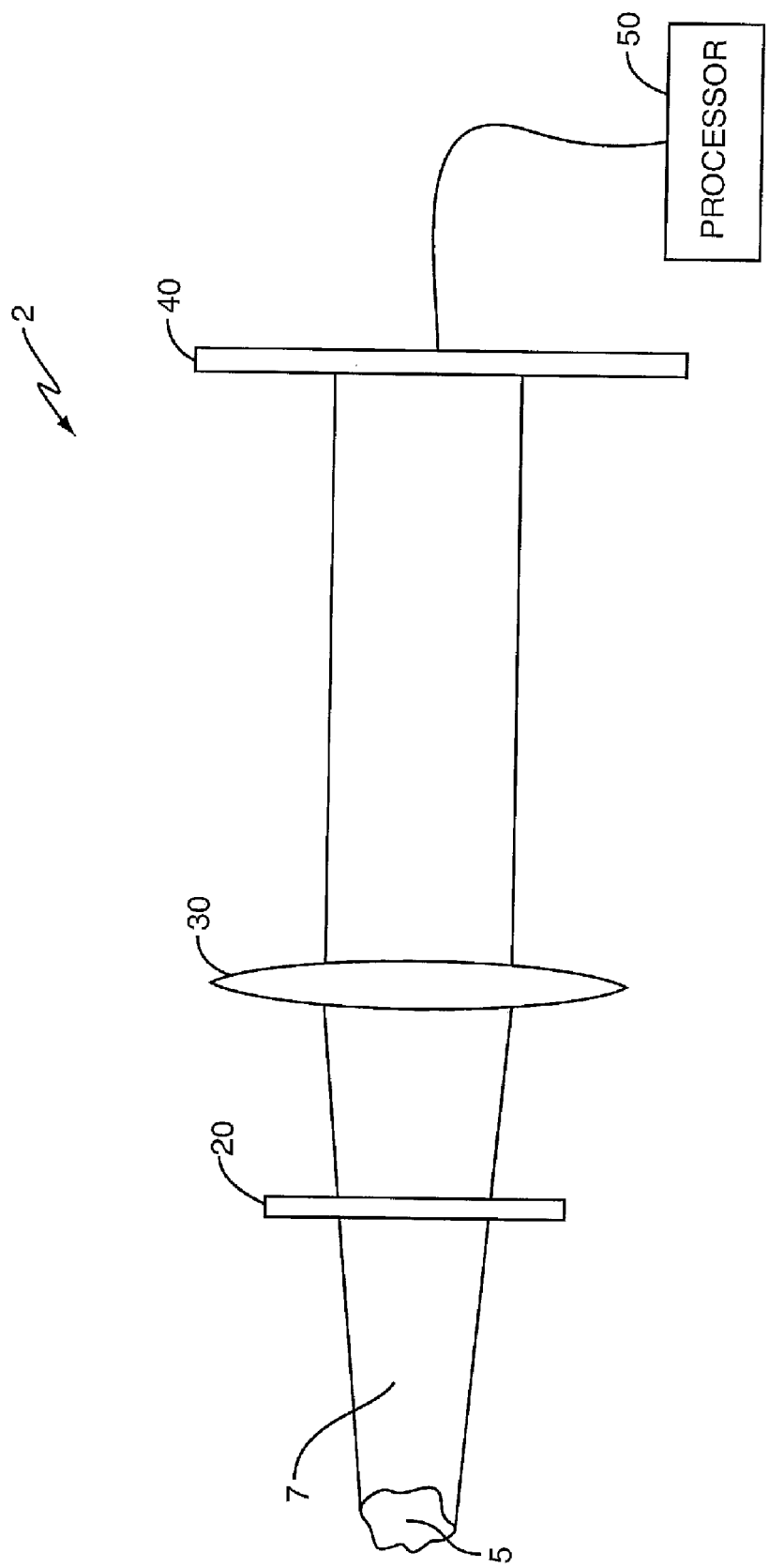
FIG. 1 shows a side view of a conventional Fabry-Perot optical spectrometer.

Conventional optical spectrometers typically create wavelength-specific images from incident light 7 to facilitate determination of wavelength-specific properties of the source 5 that generates the incident light 7. The source 5 may be any light source, including but not limited to diffuse light sources, illuminated samples, such as illuminated biological, biomedical, and geological samples, etc. A classic example of a conventional optical spectrometer is a Fabry-Perot spectrometer 2, shown in FIG. 1. Fabry-Perot spectrometer 2 includes a Fabry-Perot filter 20, a lens or lens system 30, a detector array 40, and a processor 50. Filter 20 transmits and reflects the incident light 7 multiple times to generate a spatial pattern for each wavelength component of the incident light 7. Lens 30 images the spatial pattern onto detector array 40. Each detector element of the detector array 40 detects the intensity of the incident spatial patterns and provides a corresponding electrical output signal to processor 50. The processor 50 processes the detector output signals to generate the spectral information associated with the source 5.

Figure 2A:
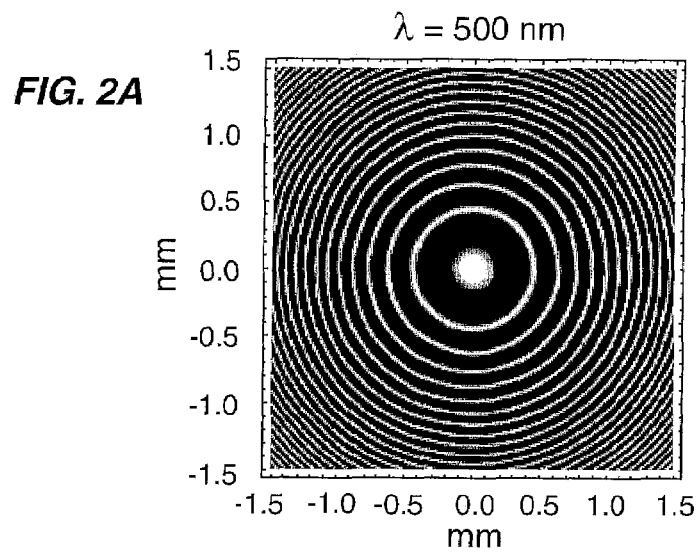
FIGS. 2A-2C show exemplary spatial patterns created by the Fabry-Perot spectrometer of FIG. 1.
Figure 2B:
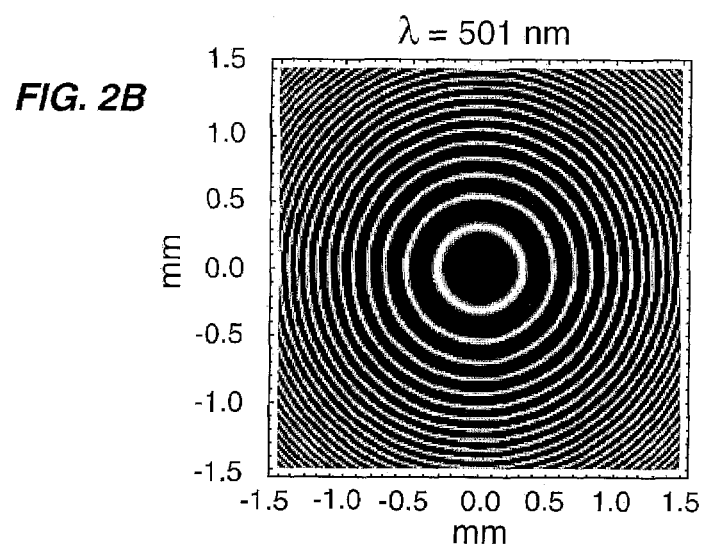
Figure 2C:
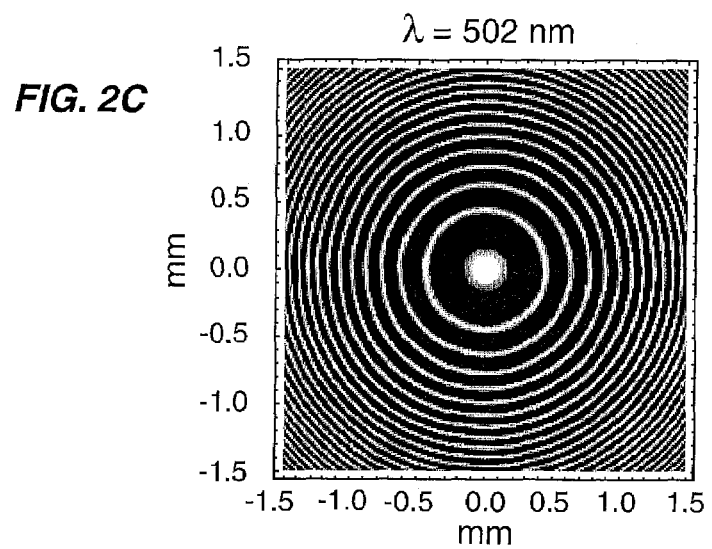

Due to the multiple transmissions and reflections caused by filter 20, each wavelength-dependent spatial pattern comprises an interference pattern having areas of constructive and destructive interference. FIGS. 2A-2C show three Fabry-Perot spatial patterns generated by a Fabry-Perot filter 20 for three different wavelengths. The filter 20 used to generate these figures has a 2 nm free spectral range. As shown by FIGS. 2A-2C, each wavelength-specific spatial pattern comprises a radially symmetric ring pattern, where each ring pattern is centered at the same location on the detector array 40. As such, while the spatial patterns cover a wide area of detector array 40, useful information may only be obtained from data sampled from detector elements disposed along one radial dimension of the spatial pattern. Further, the spatial patterns shown in FIGS. 2A and 2B are separated by 1 nm, which is within the free spectral range of the filter 20. As such, the spatial patterns are visibly different. Contrastingly, the spatial patterns shown in FIGS. 2A and 2C are separated by 2 nm, which corresponds to the free spectral range of the filter 20. Therefore, while these spatial patterns correspond to different wavelengths, these spatial patterns are identical and will fully overlap at the detector array 40. This degeneracy prevents processor 50 from distinguishing all of the different spatial patterns generated by filter 20. As such, the symmetry and overlap properties associated with the Fabry-Perot filter 20 typically limit the analysis capability of conventional Fabry-Perot spectrometers 2 to a single free spectral range. Because the free spectral range of Fabry-Perot filters is typically in the range of tens of microns, the applicability of conventional Fabry-Perot spectrometers 2 to diffuse or spectrally complex sources is severely limited.

Figure 3:
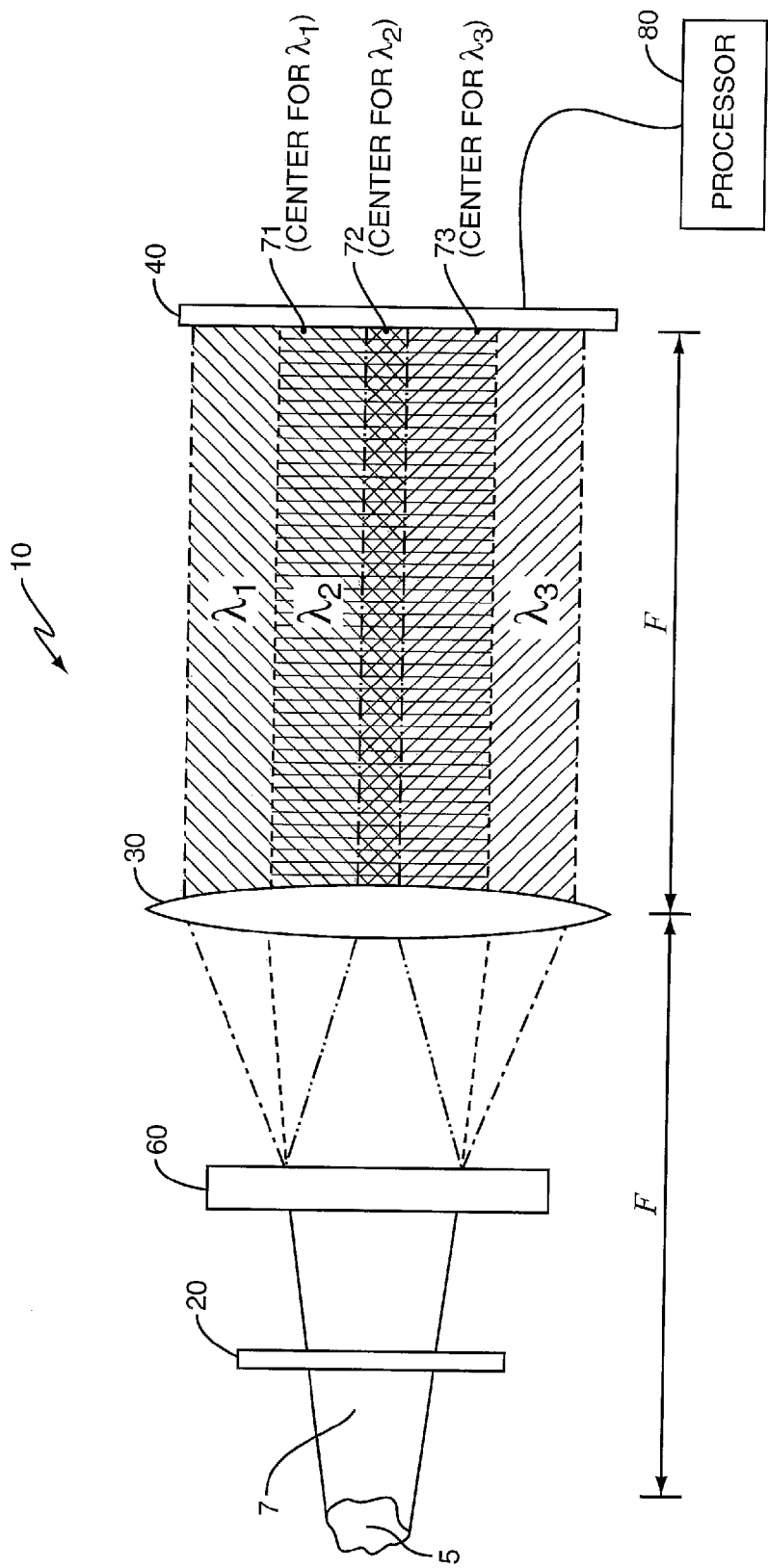
FIG. 3 shows a top view of one exemplary optical spectrometer according to the present invention.

The present invention resolves these problems using a dispersion system 60, as illustrated by the top view of the exemplary optical spectrometer 10 shown in FIG. 3. In addition to the Fabry-Perot filter 20, lens 30, and detector array 40 discussed briefly above, the inventive spectrometer 10 includes dispersion system 60 and processor 80.

Figure 4:
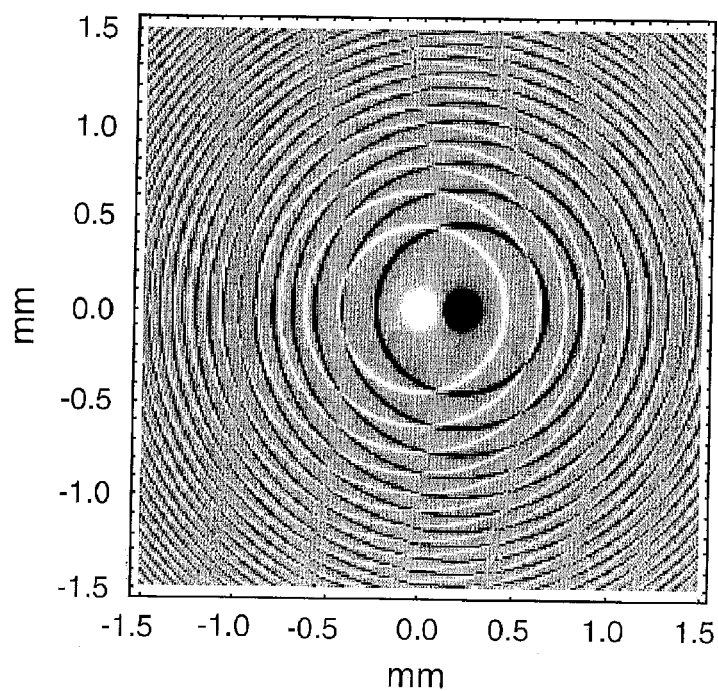
FIG. 4 shows an exemplary superimposed image of multiple spatial patterns created by the optical spectrometer of FIG. 3.

Dispersion system 60 disperses the input light according to the light's constituent component wavelengths. The exemplary dispersion system 60 of FIG. 3 disperses three spatial patterns corresponding to three different wavelengths along the horizontal dimension of the detector array 40. As a result, the radially symmetric spatial patterns are centered at three different positions 71, 72, 73, respectively, on detector array 40. In other words, the center 71 for the spatial pattern corresponding to $\lambda_1$ is offset from the center 72 for the spatial pattern corresponding to $\lambda_2$, which is offset from the center 73 for the spatial pattern corresponding to $\lambda_3$. Due to this offset relationship, the spatial patterns overlap in an offset relationship, which causes the superposition of the spatial patterns to produce in an asymmetric image at detector array 40. FIG. 4 illustrates one exemplary asymmetric image resulting from two superimposed spatial patterns for two different wavelengths. As discussed in further detail below, the asymmetry of the superimposed image enables processor 80 to obtain different information from data samples acquired from detector elements disposed along different radial dimensions. Further, the offset images separate spatial patterns corresponding to wavelengths separated by an integer multiple of the filter's free spectral range. As such, spectrometer 10 removes the degeneracy associated with a conventional Fabry-Perot spectrometer 2, enabling processor 80 to distinguish spatial patterns associated with a wide spectral range.

Dispersion system 60 may comprise any dispersion system that disperses light along one or more dimensions of the detector array 40 based on the constituent wavelength components of the light such that spatial patterns corresponding to different wavelengths are offset at the detector array 40. In one exemplary embodiment, dispersion system 60 may comprise a one-dimensional dispersion system that disperses the filtered light along one dimension of the detector array 40, as shown in FIG. 3. As used herein, one-dimensional dispersion generally refers to dispersion along one continuous linear or non-linear path, including dispersion along any one arbitrary axis of detector array 40.

Figure 5A:
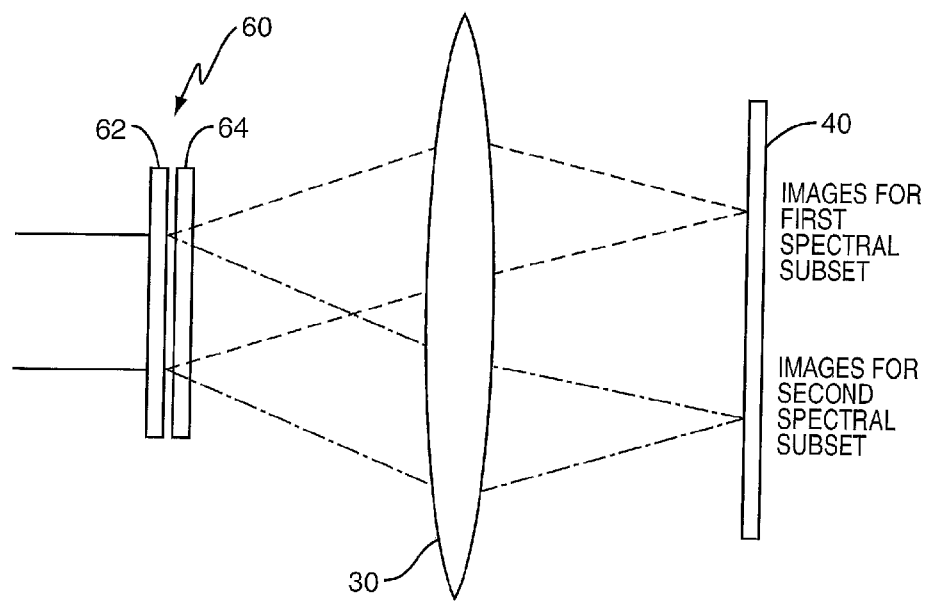
FIGS. 5A and 5B show exemplary two-dimensional dispersion systems for the optical spectrometer of FIG. 3.
Figure 5B:
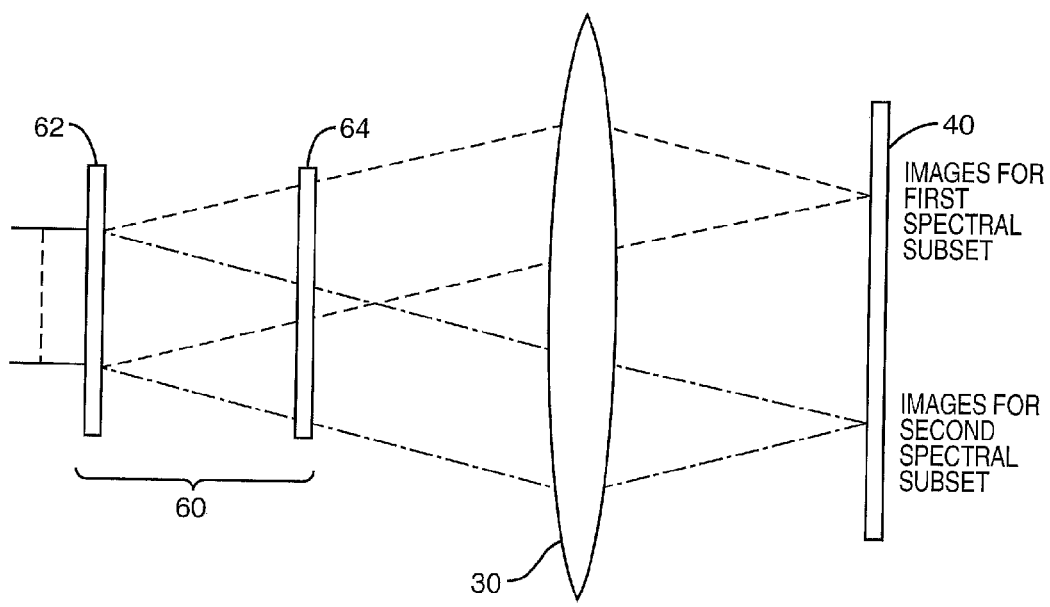

According to another exemplary embodiment, dispersion system 60 may comprise a multi-order or multi-mode dispersion system. For example, dispersion system 60 may disperse the filtered light along two dimensions such that spatial patterns associated with wavelengths in different spectral subsets of a spectral range two-dimensionally fold onto the detector array 40. Exemplary multi-mode dispersion systems 60 include stacked dispersive holograms, shown in FIG. 5A, and spaced dispersive holograms, shown in FIG. 5B. The illustrated dispersion systems 60 include two dispersive elements 62, 64 that collectively disperse wavelength components of the spatially filtered light. Each dispersive element 62, 64 disperses different spectral subsets of a predetermined spectral range onto detector array 40 along two or more offset paths. Each spectral subset includes one or more chromatically arranged wavelengths within the spectral range of the subset. In both illustrated dispersion systems 60, the first dispersive element 62 disperses light associated with wavelengths in a first spectral subset along a first path in a first dimension, and passes the light associated with wavelengths in a second spectral subset. Similarly, the second dispersive element 64 passes the light associated with the wavelengths in the first spectral subset, and disperses the light associated with wavelengths in the second spectral subset along a second path in the first dimension, where the second path is offset from the first path in a second dimension. Thus, a multi-mode dispersion system 60 disperses the spatial patterns in two dimensions. It will be appreciated that while dispersion system 60 may disperse the filtered light such that the second spectral subset at least partially overlaps the first spectral subset, such is not required.

Regardless of the type of dispersion system 60 utilized, lens system 30 images the dispersed light onto detector array 40. While FIG. 3 shows lens system 30 as a single lens element, those skilled in the art will appreciate that lens system 30 may comprise multiple lenses that collectively achieve the desired imaging properties. According to one exemplary embodiment, lens system 30 comprises a Fourier transform lens or system of lenses positioned such that source 5 lies in the front focal plane of the lens system 30 and such that the detector array 40 lies in the back focal plane of lens system 30, as shown in FIG. 3. By positioning lens system 30 in this manner, the spatial patterns at the detector array 40 may be mathematically represented as the Fourier transform of the source 5 having spatial frequencies corresponding to $u=x/\lambda F$ and $v=y/\lambda F$, where x and y represent the Cartesian positions on detector array 40, $\lambda$ represents the target wavelength, and F represents the focal length of lens system 30. As discussed in further detail below, this orientation facilitates the processing implemented by processor 80.

Detector array 40 detects the intensity of the filtered, dispersed, and imaged light. Detector array 40 advantageously takes the form of an orderly array of individual detector elements arranged in columns and rows. The detector elements sense the intensity of the light of the superimposed spatial patterns incident on the detector array 40, and convert the sensed intensity into an electrical output signal, i.e., an output voltage. The output signal for each detector element is provided to processor 80. While the detector array 40 described herein is generally a planar two-dimensional detector array, it will be appreciated that such is not required.

Processor 80 processes at least a portion of the output signals provided by the detector elements of detector array 40 to estimate the spectral properties of the source 5. In general, processor 80 processes data samples gathered from the detector elements disposed along at least one dimension of the detector array 40. As used herein, "one dimension" of detector elements refers to a set of detector elements arranged along a continuous linear or non-linear path, including a set of detector elements arranged along any one arbitrary axis of the detector array 40. For example, processor 80 may process data samples gathered from the detector elements disposed along an "easterly" horizontal dimension 52 or a "northerly" vertical dimension 54 shown in FIG. 6. Other possible dimensions include a "westerly" horizontal dimension 53, a "southerly" vertical dimension 55, and any diagonal dimensions, such as diagonal dimensions 56 and 57. It will be appreciated that detector elements along any dimension of the detector array 40 may be used to provide the data samples.

Further, because the superimposed spatial patterns create an asymmetrical image at the detector array 40, the detector elements disposed along different dimensions provide different information about the same spatial patterns. As such, processor 80 may also process the data samples provided by detector elements disposed along two or more dimensions. For example, processor 80 may process data samples provided by the detector elements disposed along the dimensions 52, 54, and 57 shown in FIG. 6. In any event, processor 80 generates the spectral estimates by applying an inversion process to the gathered data samples to the data samples acquired from detector elements disposed along one or more dimensions.

The following provides exemplary mathematical details associated with the filtered, dispersed, and imaged light to facilitate discussions related to the operations of processor 80. These exemplary mathematical details assume that spatial planar filter 20 is a Fabry-Perot filter, that dispersion system 60 is a holographic diffraction grating, and that lens system 30 is a Fourier transform lens system.

Spatial planar filter 20 modulates the incident light 7 according to the corresponding angular and spectral transmission function, represented as $T(\theta,\lambda)$, where $\theta$ represents the angle between the propagation direction of a ray of the incident light 7 and the optical axis of the spectrometer 10. The spatial frequencies u, v at the detector array 40 are associated with $\theta$ according to $\sqrt{u^2+v^2}=\sin(\theta/\lambda)$. Without dispersion system 60, the spatial patterns observed on the detector array 40 when source 5 is a diffuse source may be mathematically represented by:

$$g(x, y) = \int T\left(\theta = \arcsin\left[\frac{\sqrt{x^2 + y^2}}{F}\right], \lambda\right) S(\lambda) d\lambda, \quad (1)$$

where $S(\lambda)$ represents the spectral density information of the source 5. As discussed above, $T(\theta,\lambda)$ is periodic in $\lambda$, with a period given by the free spectral range $\Delta_\lambda$ of the filter 20. In the case of a Fabry-Perot filter, the free spectral range is given by $\Delta_\lambda = \lambda^2/2d$, where d is the gap thickness of the filter 20 (see FIGS. 7A and 7B). Typically, the free spectral range of a Fabry-Perot filter 20 is in the range of tens of nanometers. As discussed above, the periodicity caused by the small free spectral range severely restricts the ability of conventional Fabry-Perot spectrometers 2 to determine spectral estimates over a wide range of wavelengths.

Figure 6:
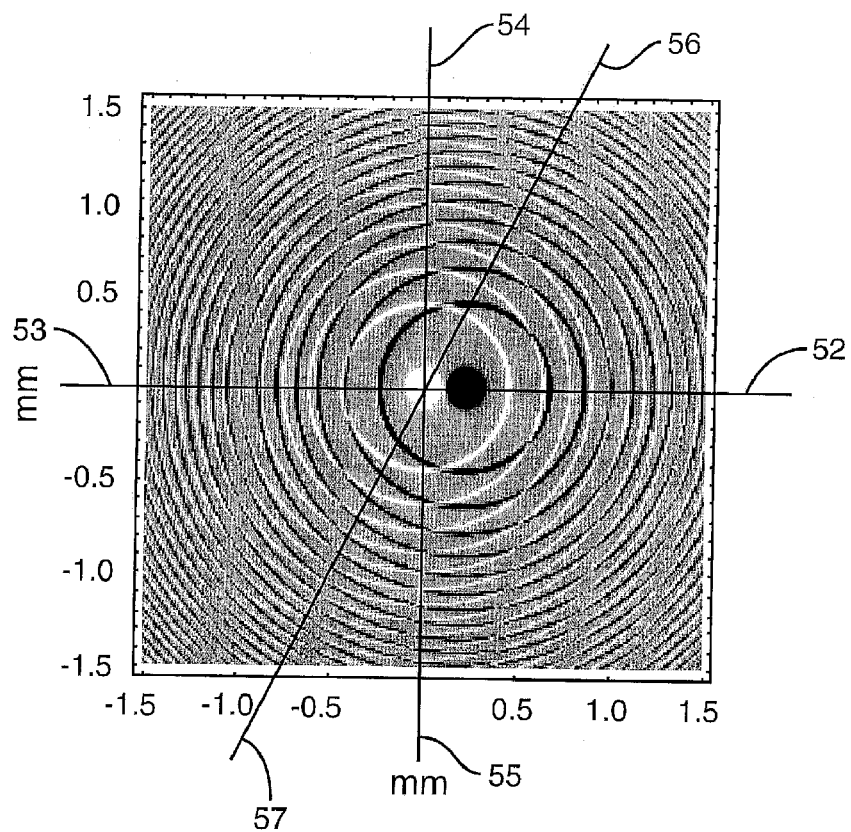
FIG. 6 shows sampling dimensions for the exemplary superimposed image of multiple spatial patterns shown in FIG. 4.

The introduction of the dispersion system 60, as discussed above, removes the degeneracy caused by the repetition of the Fabry-Perot spatial patterns from one free spectral range to the next, and enables spectral reconstruction over a spectral range extending beyond the free spectral range of the filter 20. More particularly, dispersion system 60 transforms the radially symmetric spatial patterns associated with the conventional Fabry-Perot spectrometer into a two-dimensional invertible mapping between the source spectrum and the detector array output signals. As an example, assume that dispersion system 60 disperses the light along the horizontal dimension 52 of the detector array 40, as shown in FIGS. 3, 4, and 6. The resulting spatial patterns at the detector array 40 may be represented by:

$$g(x, y) = \int T\left(\theta = \arcsin\left[\frac{\sqrt{(x - \alpha\lambda)^2 + y^2}}{F}\right], \lambda\right) S(\lambda) d\lambda, \quad (2)$$

where $\alpha$ represents the dispersion constant determined by the grating period and the position of the holographic grating system 60. For a Fabry-Perot filter, $T(\theta,\lambda)$ may be represented by:

$$T(\theta, \lambda) = \frac{(1 - R)^4}{1 + R^2 - 2R\cos\left(4\pi\frac{nd}{\lambda}\cos\theta\right)}, \quad (3)$$

where R represents the reflectance of the cavity mirrors of the Fabry-Perot filter 20 and n represents the index of refraction of the cavity core. Substituting Equation (3) into Equation (2) produces:

$$g(x, y) = \int \frac{(1 - R)^4}{1 + R^2 - 2R\cos\left(4\pi\frac{nd}{\lambda F}\sqrt{F^2 - (x - \alpha\lambda)^2 - y^2}\right)} S(\lambda) d\lambda. \quad (4)$$

Equation (4) may be expressed as:

$$g(x,y) = \int h(x,y,\lambda) S(\lambda) d\lambda, \quad (5)$$

where $$h(x, y, \lambda) = \frac{(1 - R)^4}{1 + R^2 - 2R\cos\left(4\pi\frac{nd}{\lambda F}\sqrt{F^2 - (x - \alpha\lambda)^2 - y^2}\right)} \quad (6)$$

for a single modal dispersion system 60. When the dispersion system 60 comprises a multi-modal dispersion system 60 that disperses the filtered light along two dimensions, e.g., a horizontal dimension 52 and vertical dimension 54, the sampling function may be expressed as:

$$h(x, y, \lambda) = \frac{(1 - R)^4}{1 + R^2 - 2R\cos\left(4\pi\frac{nd}{\lambda F}\sqrt{F^2 - (x - \alpha_x\lambda)^2 - y^2}\right)} + \\ \frac{(1 - R)^4}{1 + R^2 - 2R\cos\left(4\pi\frac{nd}{\lambda F}\sqrt{F^2 - x^2 - (y - \alpha_y\lambda)^2}\right)} \quad (7)$$

It will be appreciated that other versions of $h(x,y,\lambda)$ may be defined for other dimensions. In either case, at a fixed spatial position $(x,y)$, $h(x,y,\lambda)$ is a sharply peaked function of $\lambda$. As such, $h(x,y,\lambda)$ may be thought of as a sampling function that integrates the value of $S(\lambda)$ at specific values of $\lambda$ corresponding to wavelengths at which:

$$\cos\left(4\pi\frac{nd}{\lambda F}\sqrt{F^2 - (x - \alpha_x\lambda)^2 - y^2}\right) = 1 \quad (8)$$

and/or $$\cos\left(4\pi\frac{nd}{\lambda F}\sqrt{F^2 - x^2 - (y - \alpha_y\lambda)^2}\right) = 1$$

The mathematical analysis discussed above highlights the fact that selecting the filter, dispersion, and lens parameters that make $g(x,y)$ numerically well-conditioned and algorithmically efficient optimizes the sampling function $h(x,y,\lambda)$, which simplifies the processing operations implemented by processor 80. The processing operations may be further simplified by selecting the spacing and size of the detector elements within detector array 40. Keeping these considerations in mind when designing the spectrometer 10 described herein enables processor 80 to reconstruct the spectral information $S(\lambda)$ for source 5 using a relatively simple inversion process.

Figure 7A:
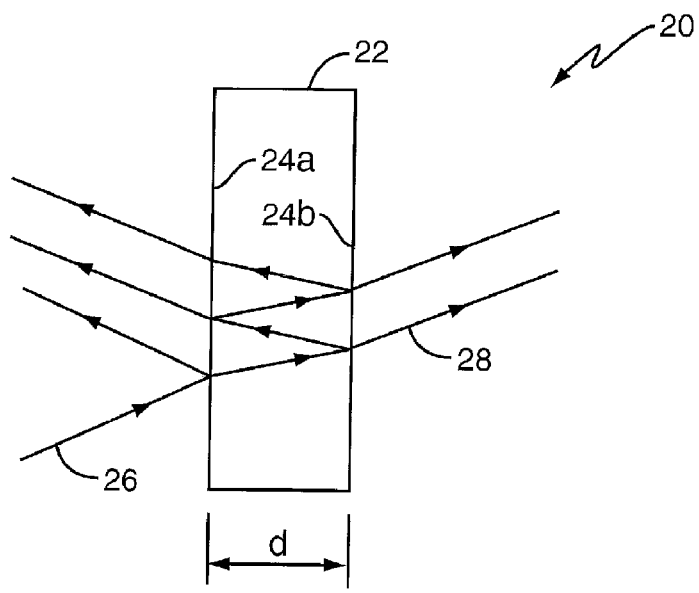
FIGS. 7A and 7B show exemplary Fabry-Perot filters for the optical spectrometer of FIG. 3
Figure 7B:
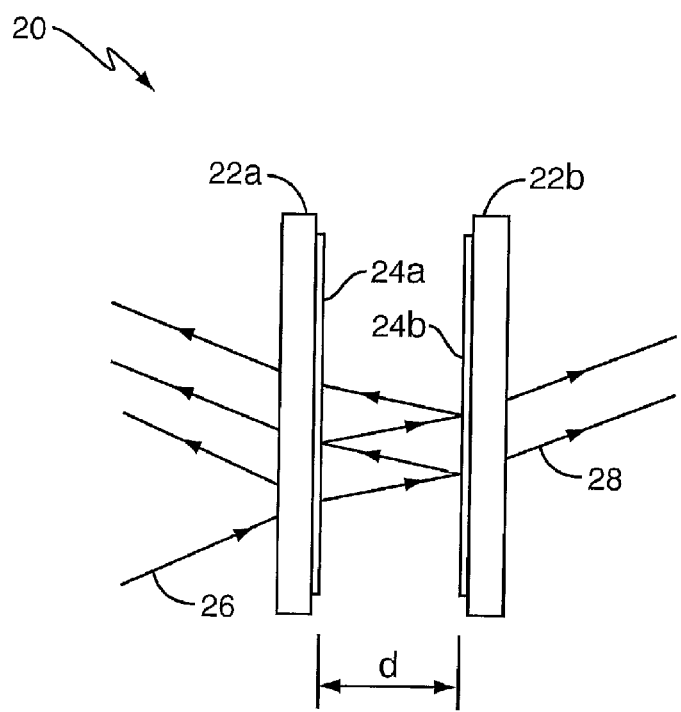

The above describes the spectrometer 10 in terms of a Fabry-Perot filter 20. FIGS. 7A and 7B show exemplary Fabry-Perot filters 20, where FIG. 7A shows a Fabry-Perot etalon 20 and FIG. 7B shows a Fabry-Perot interferometer 20. The Fabry-Perot etalon 20 of FIG. 7A comprises a transparent plate 22 that includes opposing inner reflective surfaces 24a, 24b separated by the filter thickness d. Similarly, the Fabry-Perot interferometer 20 of FIG. 7B comprises two parallel transparent plates 22a, 22b that include reflective surfaces 24a, 24b on opposing inner sides of the plates 22a, 22b, where the reflective surfaces 24a, 24b are separated by the filter gap thickness d. In both embodiments, reflective surfaces 24a, 24b reflect an incident light ray 26 multiple times to generate multiple output rays 28. The multiple output rays 28 combine constructively and destructively to generate the spatial patterns shown in FIGS. 2A-2C.

While the above primarily describes the invention in terms of the Fabry-Perot filter 20, filter 20 may comprise any planar spectral filter 20. As used herein, the term "planar spectral filter" includes any filter comprising a sequence of two or more partially reflecting surfaces separated by a space that can be vacuum, a gas, or a transparent dielectric. The reflecting surfaces need not be parallel. Exemplary planar spectral filters include but are not limited to Fabry-Perot filters, Fizeau filters, etalons, dichroic filters, thin film transmission/reflection filters, and multiple film transmission/reflection filters.

Further, the above-described spectrometer 10 uses lens system 30 in combination with filter 20 to produce a known spatial pattern for a diffuse or incoherent source. However, the present invention does not require a lens system 30. When processor 80 knows the spatial structure of source 5 a priori, processor 80 may invert the spatial pattern to generate the desired spectral estimates even if the lens system 30 is not included in the spectrometer.

In addition, while FIG. 3 shows dispersion system 60 disposed between filter 20 and lens system 30, the present invention is not so limited. Those skilled in the art will appreciate that the filter 20, lens 30, and/or dispersion system 60 may be disposed in any order between source 5 and detector array 40.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An optical spectrometer comprising:
    a planar spectral filter configured to filter incident light to generate a plurality of wavelength dependent spatial patterns;
    a detector array having at least two dimensions;
    a dispersion system disposed between the filter and the detector array, said dispersion system configured to disperse the spatial patterns along at least one dimension in a wavelength dependent fashion onto the detector array; and
    a processor operatively connected to the detector array, said processor configured to generate spectral estimates of the incident light based on the spatial patterns dispersed onto the detector array.

2. The optical spectrometer of claim 1 wherein the dispersion system is configured to disperse the spatial patterns in a wavelength dependent fashion in at least two dimensions onto the detector array.

3. The optical spectrometer of claim 1 wherein the dispersion system is configured to disperse a first spatial pattern so that a center thereof is centered at a first position on the detector array, wherein the dispersion system is configured to disperse a second spatial pattern so that a center thereof is centered at a second position on the detector array, and wherein the first position is different from the second position.

4. The optical spectrometer of claim 1 wherein the dispersion system is configured to disperse first and second spatial patterns onto the detector array in an overlapping but offset relationship.

5. The optical spectrometer of claim 1 wherein the dispersion system is configured to disperse first and second spatial patterns onto the detector array such that the first and second spatial patterns superimpose in an offset relationship at the detector array.

6. The optical spectrometer of 1 wherein the processor is configured to generate the spectral estimates by:
    sampling in at least one dimension the spatial patterns dispersed onto the detector array to generate a plurality of data samples; and
    inverting the plurality of data samples to generate the spectral estimates of the incident light.

7. The optical spectrometer of claim 6 wherein the processor is configured to sample the spatial patterns dispersed onto the detector array in at least two dimensions to generate the plurality of data samples.

8. The optical spectrometer of claim 1 further comprising a lens system disposed between the dispersion system and the detector array, said lens system configured to image the spatial patterns onto the detector array.

9. The optical spectrometer of claim 8 wherein the lens system has a focal length and wherein the lens system is disposed one focal length away from a source of the incident light and one focal length away from the detector array.

10. The optical spectrometer of claim 1 wherein the planar spectral filter comprises one of a Fabry-Perot filter, a Fizeau interferometer, an etalon, a dichroic filter, a thin film transmission filter, a multiple film transmission filter, a thin film reflection filter, and a multiple film reflection filter.

11. An optical spectrometer comprising:
    a planar spectral filter configured to filter incident light to generate a plurality of wavelength dependent spatial patterns;
    a detector array having at least two dimensions;
    a dispersion system disposed between the filter and the detector array, said dispersion system configured to disperse the spatial patterns in at least one dimension in a wavelength dependent fashion onto the detector array;
    a lens system disposed between the dispersion system and the detector array, said lens system configured to image the spatial patterns onto the detector array; and
    a processor operatively connected to the detector array, said processor configured to:
        sample the spatial patterns dispersed onto the detector array in at least two dimensions to generate a plurality of data samples; and
        generate spectral estimates of the incident light based on the plurality of data samples.

12. The optical spectrometer of claim 11 wherein the planar spectral filter comprises a Fabry-Perot filter.

13. The optical spectrometer of claim 11 wherein the lens system comprises a Fourier transform lens system.

14. A method of processing incident light comprising:
    spectrally filtering the incident light with a planar spectral filter to generate a plurality of wavelength dependent spatial patterns;
    dispersing the filtered light to disperse the spatial patterns in at least one dimension in a wavelength dependent fashion onto a detector array having at least two dimensions; and processing output signals provided by the detector array to generate spectral estimates of the incident light based on the spatial patterns dispersed onto the detector array.

15. The method of claim 14 wherein dispersing the filtered light comprises dispersing the filtered light in a wavelength dependent fashion in at least two dimensions onto the detector array.

16. The method of claim 14 wherein dispersing the filtered light comprises dispersing a first spatial pattern so that a center thereof is centered at a first position on the detector array and dispersing a second spatial pattern so that center thereof is centered at a second position on the detector array different from the first position.

17. The method of claim 14 wherein processing the output signals comprises:

sampling in at least one dimension the spatial patterns dispersed onto the detector array to generate a plurality of data samples; and inverting the plurality of data samples to generate the spectral estimates of the incident light.

18. The method of claim 17 wherein sampling the spatial patterns comprises sampling in at least two dimensions the spatial patterns dispersed onto the detector array to generate the plurality of data samples.

19. The method of claim 14 further comprising providing the incident light from a diffuse source.

20. The method of claim 19 wherein the diffuse source comprises an illuminated biological sample.

21. The method of claim 14 wherein spectrally filtering the incident light comprises spectrally filtering the incident light with one of a Fabry-Perot filter, a Fizeau interferometer, an etalon, a dichroic filter, a thin film transmission filter, a multiple film transmission filter, a thin film reflection filter, and a multiple film reflection filter.

* * * * *